(12) United States Patent
Weber et al.

(10) Patent No.: US 8,157,878 B2
(45) Date of Patent: Apr. 17, 2012

(54) AIR DISTRIBUTION ARRANGEMENT FOR A DUST COLLECTOR SYSTEM

(75) Inventors: Jason Weber, Sabetha, KS (US); Dwight Edelman, Sabetha, KS (US)

(73) Assignee: Mac Process LLC, Sabetha, KS (US)

( * ) Notice: Subject to any disclaimer, the term of this patent is extended or adjusted under 35 U.S.C. 154(b) by 242 days.

(21) Appl. No.: 12/576,048

(22) Filed: Oct. 8, 2009

(65) Prior Publication Data

US 2011/0083407 A1 Apr. 14, 2011

(51) Int. Cl.
    *B01D 46/04* (2006.01)
(52) U.S. Cl. .......................................... 55/302; 95/280
(58) Field of Classification Search .................. 55/302, 55/283, 490, 493, 521, 344, 502, 303; 95/278, 95/279, 280; 366/8, 18, 26, 30; 29/402.08
    See application file for complete search history.

(56) References Cited

U.S. PATENT DOCUMENTS

| | | | | |
|---|---|---|---|---|
| 4,097,254 A * | 6/1978 | Noland | ........................... | 55/294 |
| 4,319,897 A * | 3/1982 | Labadie | ........................... | 55/302 |
| 4,322,231 A * | 3/1982 | Hilzendeger et al. | ........... | 55/357 |
| 6,613,115 B2 * | 9/2003 | Moore | ............................. | 55/302 |
| 6,638,344 B2 * | 10/2003 | Horton et al. | ................... | 95/280 |
| 2008/0127825 A1 * | 6/2008 | Raether | ............................ | 95/280 |
| 2008/0127826 A1 * | 6/2008 | Raether | ............................ | 95/280 |
| 2008/0127827 A1 * | 6/2008 | Raether | ............................ | 95/280 |
| 2011/0185689 A1 * | 8/2011 | Raether et al. | .................. | 55/303 |

* cited by examiner

*Primary Examiner* — Duane Smith
*Assistant Examiner* — Minh-Chau Pham
(74) *Attorney, Agent, or Firm* — Hovey Williams LLP

(57) ABSTRACT

A dust collector system including a plurality of air filters that are at least partially self-cleaning via a pulsed air system. The dust collector system presents a self-aligning, tool-free assembly for providing the pulsed air. The pulsed air system includes an air distribution assembly including an air distribution manifold having a plurality of purge pipes and a frame for supporting at least some of the purge pipes, wherein at least two or more of the purge pipes are coupled together in a generally unitary assembly; and a positioning assembly for selectively positioning and removably locking the air distribution manifold in either of a service position or an operational position.

17 Claims, 14 Drawing Sheets

AIR DISTRIBUTION ARRANGEMENT FOR A DUST COLLECTOR SYSTEM

FIELD

Embodiments of the present invention relate to air filtration systems comprising a dust collector system including a plurality of air filter media that are at least partially self-cleaning via a pulsed air system. More particularly, embodiments of the present invention relate to a pulsed air system comprising an air distribution assembly that can be quickly and readily disengaged from an operational position and moved to a service position.

BACKGROUND

Dust collector systems for filtering and collecting dust, dirt, and other fine particulate from a particulate-laden air stream commonly include air filters, such as air filter cartridges, for filtering the dust from the clean air. The cartridges are mounted in a plate, commonly referred to as a tube sheet or a cell plate, that separates the dust collector into a lower, dirty air chamber and an upper, clean air chamber. The air filter cartridges include filter media that tend to accumulate at least a portion of the separated dust. To maintain an efficient filtering system, the dust accumulated on the filter media must be at least partially removed, especially if the dust collects in a relatively thick layer.

To dislodge the collected dust from the filter media and otherwise refresh the media, dust collector systems commonly direct pressurized air against and through the air filter cartridges in pulses, i.e., intermittently. To direct the pressurized air against and through the filter cartridges, a pipe, commonly referred to as a purge pipe, is positioned approximately 2-10 inches above the air filter cartridge. The pipe includes small openings through a bottom of the pipe facing the air filter cartridge. The pipe is fluidly connected to a pulse valve that controls pressurized air passing through the pipe, the openings in the pipe, and the air filter cartridge. The pressurized air assists in dislodging collected dust from the filter media.

Although pressurized pulse cleaning of the air filter cartridge increases the wear life of the cartridge, over time the filter media will become so particulate laden that the cartridge will need to be replaced. To replace the air filter cartridge, the purge pipe positioned over each cartridge must be removed to gain access to the cartridge. In larger size cartridge style dust collector systems, there may be dozens of purge pipes that must be removed to service the system. After removal, these pipes must be laid aside to access the cartridges.

Each purge pipe is also typically connected to the pulse valve in an air tight connection with either a compression coupling, a threaded union, a flexible hose and clamps, or other securement mechanism requiring tools to install or remove. Additionally, not only must the purge pipe be connected to the pulse valve in an air tight communication, it should be securely positioned within the system and not susceptible to any movement during operation. Otherwise, there may be a misalignment of the holes in the purge pipe and over the air filter cartridges, which results in less than optimal cleaning of the filter media.

Because dust collector system are often mounted several feet to tens of feet off the ground and with little excess room for an operator to move during service of the system, loose parts, such as removed purge pipes and their securement mechanisms, become a safety hazard. For example, the minimal amount of work space to service the system can result in the operator accidentally tripping on a purge pipe or having a pipe fall from the dust collector. There is also a danger of dropping loose parts, such as a coupling, a hose clamp, or other securement mechanism, or the tools used during servicing of the system, such as a wrench. Additionally, loose pipes and other parts can be dropped through the openings in the tube sheet once the cartridges are removed. If these pipes, tools, or other parts are dropped through the tube sheet and not recovered, they could be transferred into other downstream processing equipment, which could cause severe damage to that equipment.

Notwithstanding the possibility of dropping or misplacing parts as described above, it is also time consuming for the operator to remove and then reinstall the purge pipes, especially if there are multiple purge pipes for large systems.

Accordingly, there is a need for a dust collector system and, in particular, a pulsed air system, that reduces installation and maintenance costs and time required for removing or installing the filter cartridges. Moreover, there is a need for a pulsed air system and, in particular, an air distribution assembly comprising a plurality of purge pipes that can be readily removed without use of tools and without dismantling or otherwise removing the purge pipes from the dust collector system.

SUMMARY

Embodiments of the present invention solve the above-described problems and provide a distinct advance in the art of air distribution arrangements for dust collector systems. In particular, embodiments of the present invention provide a dust collector system broadly comprising a housing; a hopper extending from the housing to collect dust; a tube sheet mounted within the housing and generally dividing the housing into a lower, dirty air chamber and an upper, clean air chamber; at least one filter cartridge configured to be removably mounted in the tube sheet; and a pulsed air system for at least partially cleaning the at least one filter cartridge.

The pulsed air system of embodiments of the present invention broadly comprises a pressurized air source; at least one pulsed air valve; a controller for controlling the pulsed air valve and pulsed distribution of the pressurized air; an air distribution assembly including a plurality of purge pipes; and tubing for delivering the pressurized air from the pressurized air source and to the air distribution assembly.

The air distribution assembly of embodiments of the present invention broadly comprises an air distribution manifold including the plurality of purge pipes and a frame for supporting at least some of the purge pipes, wherein at least two or more of the purge pipes are coupled together in a generally unitary assembly; a coupling assembly for fluidly connecting the purge pipes with the tubing; and a positioning assembly for selectively positioning and removably locking the air distribution manifold in either of a service position or an operational position.

Implementation of embodiments of the present invention reduces the time required for installing and removing air filter cartridges from the dust collector system. Additionally, embodiments of the present invention presents a safer dust collector system by eliminating loose components and the need for tools that could be dropped, which could result in damage to the system or injury to an operator or other personnel.

In embodiments of the present invention, the plurality of purge pipes are coupled together in a unitary assembly that can be quickly and easily secured into the operational position. Additionally, the assembly is self aligning in an air tight communication with the tubing providing the pressurized air. Further, the pipes are held in a secure position during operation and are not affected by thrust occurring from the pressurized pulses of air through the pipes.

The plurality of purge pipes are permanently held within the housing of the dust collector system and do not need to be removed from the housing for service of the air filter cartridges. The purge pipes can be positioned out of the way for cartridge service without any loose components or use of tools.

BRIEF DESCRIPTION OF THE DRAWING FIGURES

Embodiments of the present invention are described in detail below with reference to the attached drawing figures, wherein.

Figure 1:
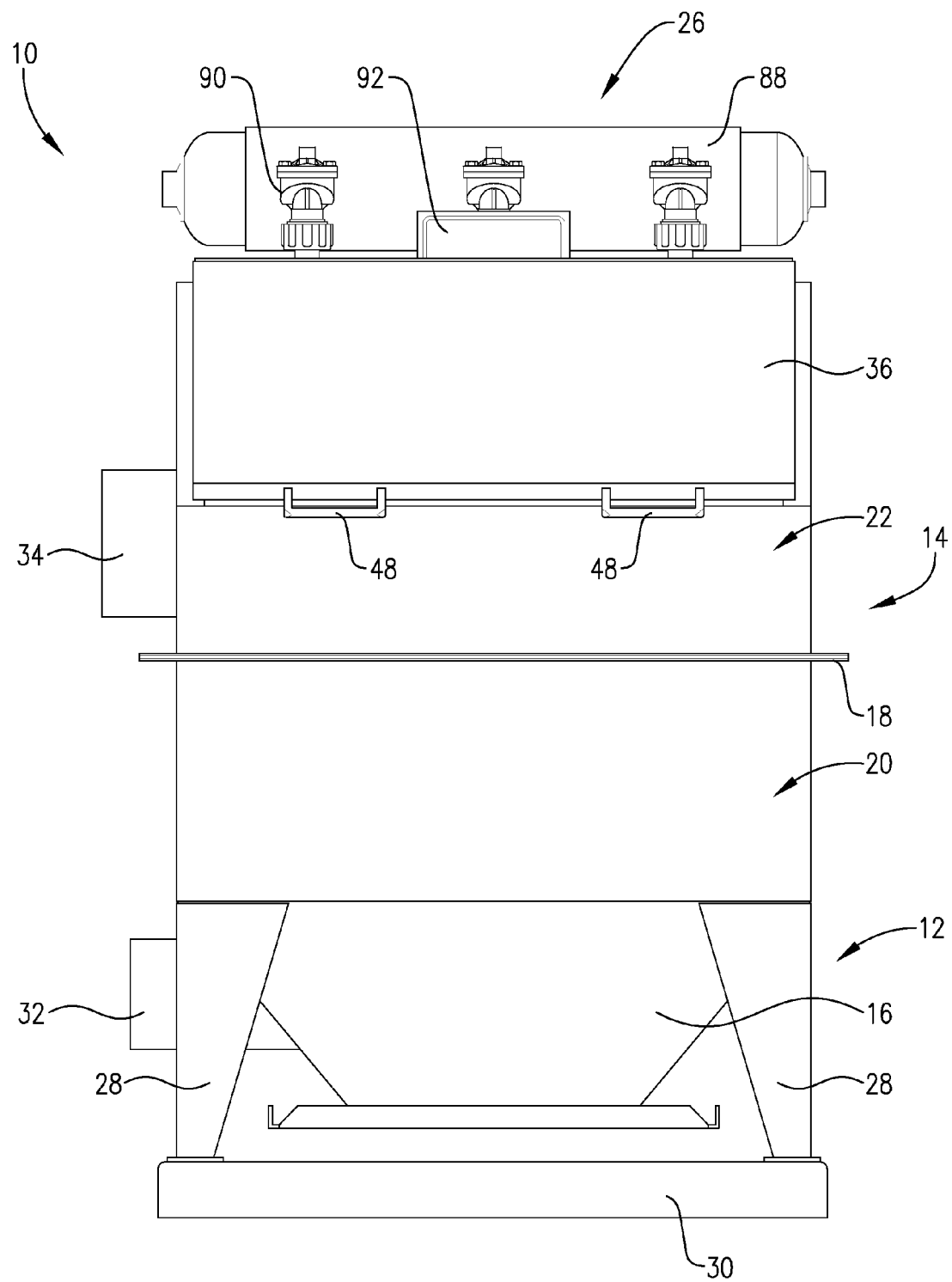
FIG. 1 is a front elevation view of a dust collector system of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, and particularly FIGS. 1-3 and 9-10, a dust collector system 10 of embodiments of the present invention broadly comprises a base 12; a housing 14 mounted on the base 12; a hopper 16 extending from the housing 14 to collect dust; a tube sheet 18 mounted within the housing 14 and generally dividing the housing 14 into a lower, dirty air chamber 20 and an upper, clean air chamber 22; at least one air filter cartridge 24 configured to be removably mounted in the tube sheet 18; and a pulsed air system 26 for at least partially cleaning the at least one air filter cartridge 24. The dust collector system 10 is operable to receive air laden with dust, dirt, and other small and fine particulate (hereinafter "dust") in the housing 14. The dust is filtered from the air by passing through the air filter cartridges 24. The filter cartridges 24 are periodically at least partially cleaned of particulate via the pulsed air system 26.

Figure 3:
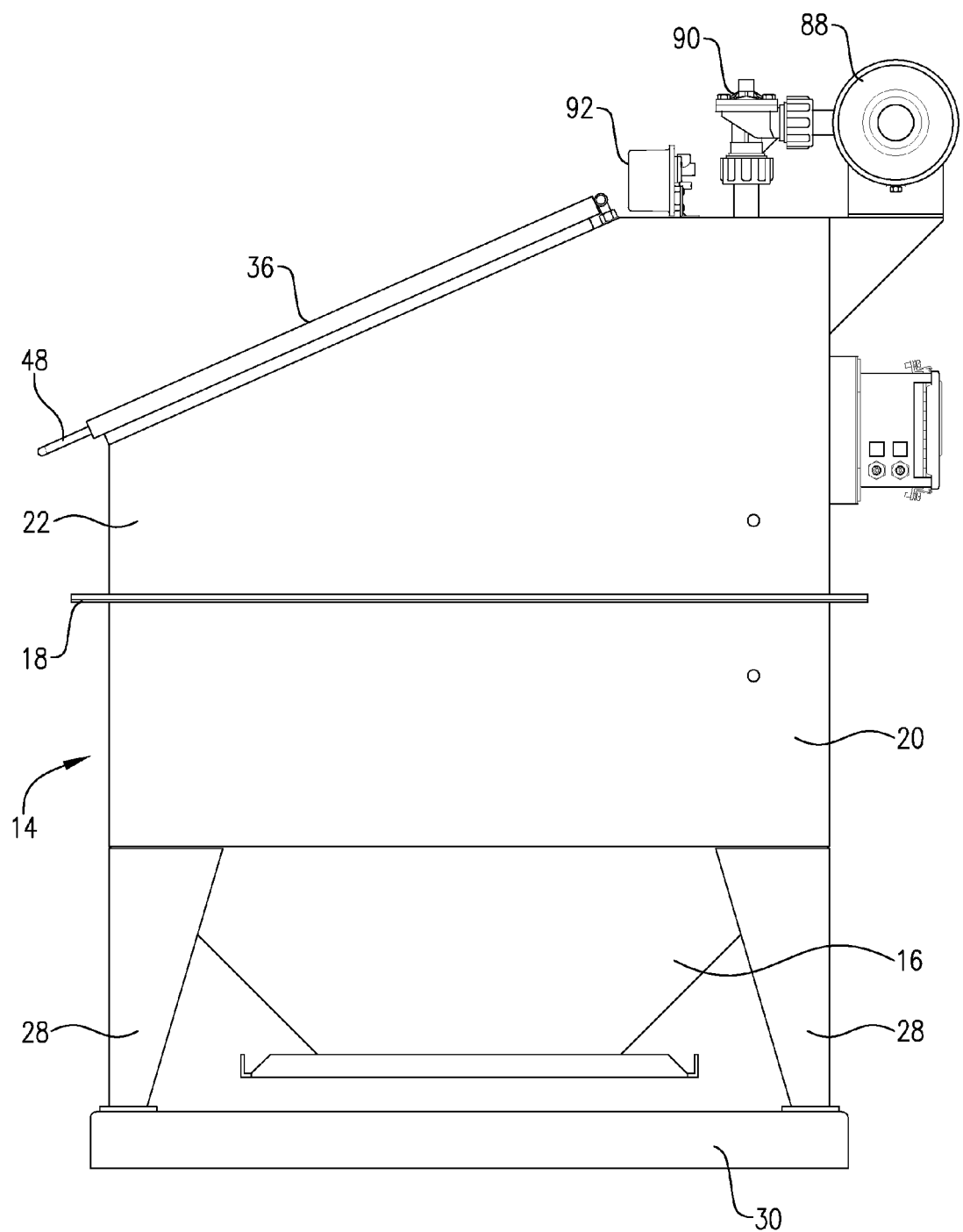
FIG. 3 is a right side elevation view of the dust collector system.

As illustrated in FIGS. 1 and 3, the base 12 comprises a plurality of legs 28 supported by a platform 30. A size of the base 12 will vary depending on a desired size of the dust collector system 10, which is further dependent on the amount of dust collecting and filtering to be performed by the particular dust collector system 10. However, in embodiments of the present invention, the base 12 is approximately 2-10 feet in width (from front to back of the system 10) and approximately 3-30 feet in length (from left to right of the system 10).

The housing 14 of the system 10 is mounted on the base 12, and in particular, is mounted on the legs 28. The housing 14 may be permanently mounted to the base 12, removably mounted to the base 12, or integral with the base 12. Similar to the base 12, a size of the housing 14 will vary depending on a desired size of the dust collector system 10. However, in embodiments of the present invention, the housing 14 is approximately 2-10 feet in width, approximately 3-30 feet in length, and approximately 3-20 feet in height. The housing 14 is preferably formed of steel, aluminum, or other material suitable for receiving and retaining pressurized air therein.

Figure 4:
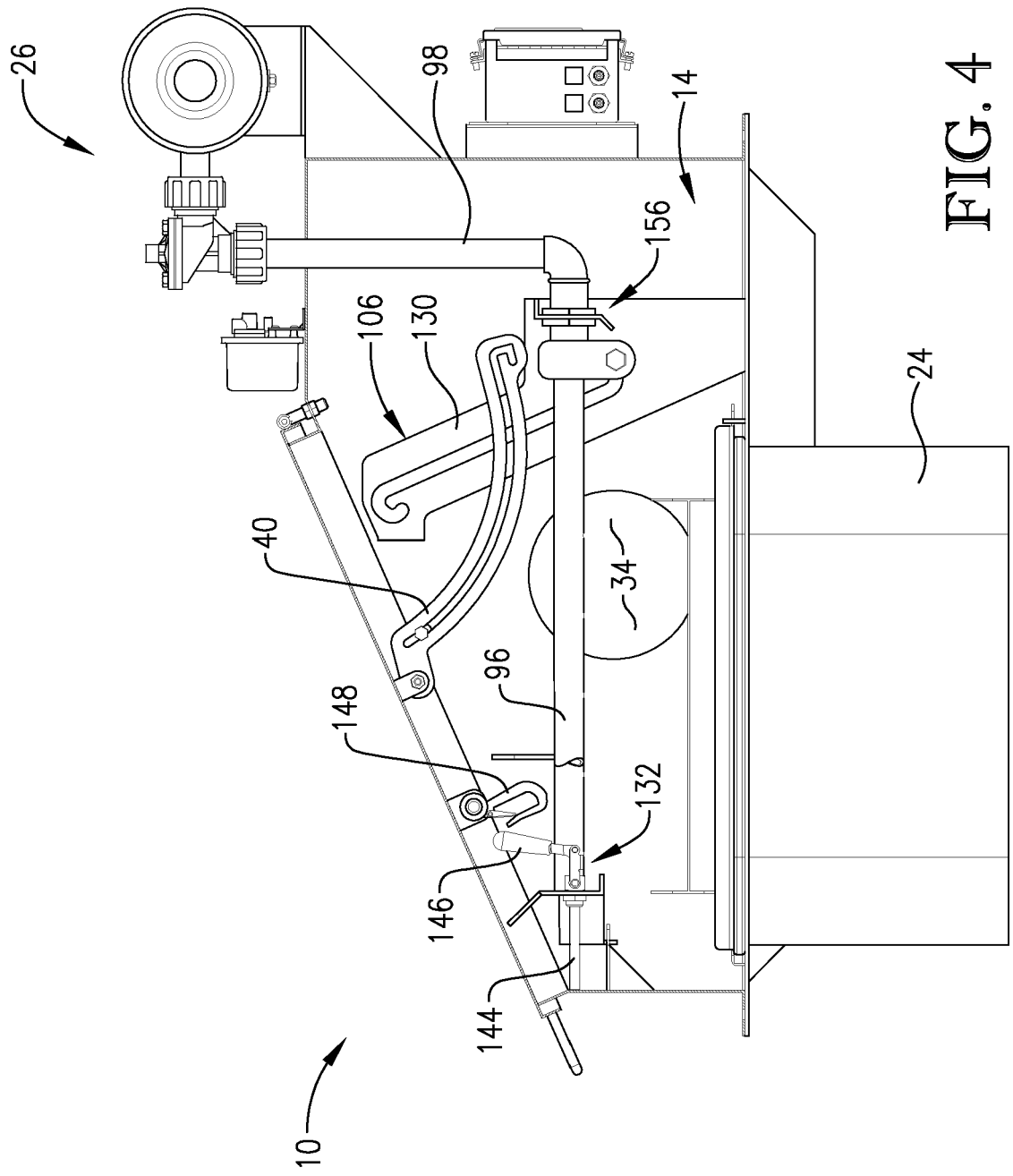
FIG. 4 is a partial side elevation view of the dust collector system and particularly illustrating a cover for the dust collector system and an air distribution assembly.

The housing 14 is generally divided into the lower, dirty air chamber 20 and the upper, clean air chamber 22. Referring to FIGS. 1 and 4, particulate-laden air is provided to the lower, dirty air chamber 20 via an input 32 formed in the hopper 16, passes upwards through the housing 14 and, in particular, the air filter cartridges 24, and exits the clean air chamber 22 of the housing 14 via an output 34. Ducts (not shown) are secured to the input 32 and the output 34 for transporting the dirty and clean air, respectively.

Figure 5:
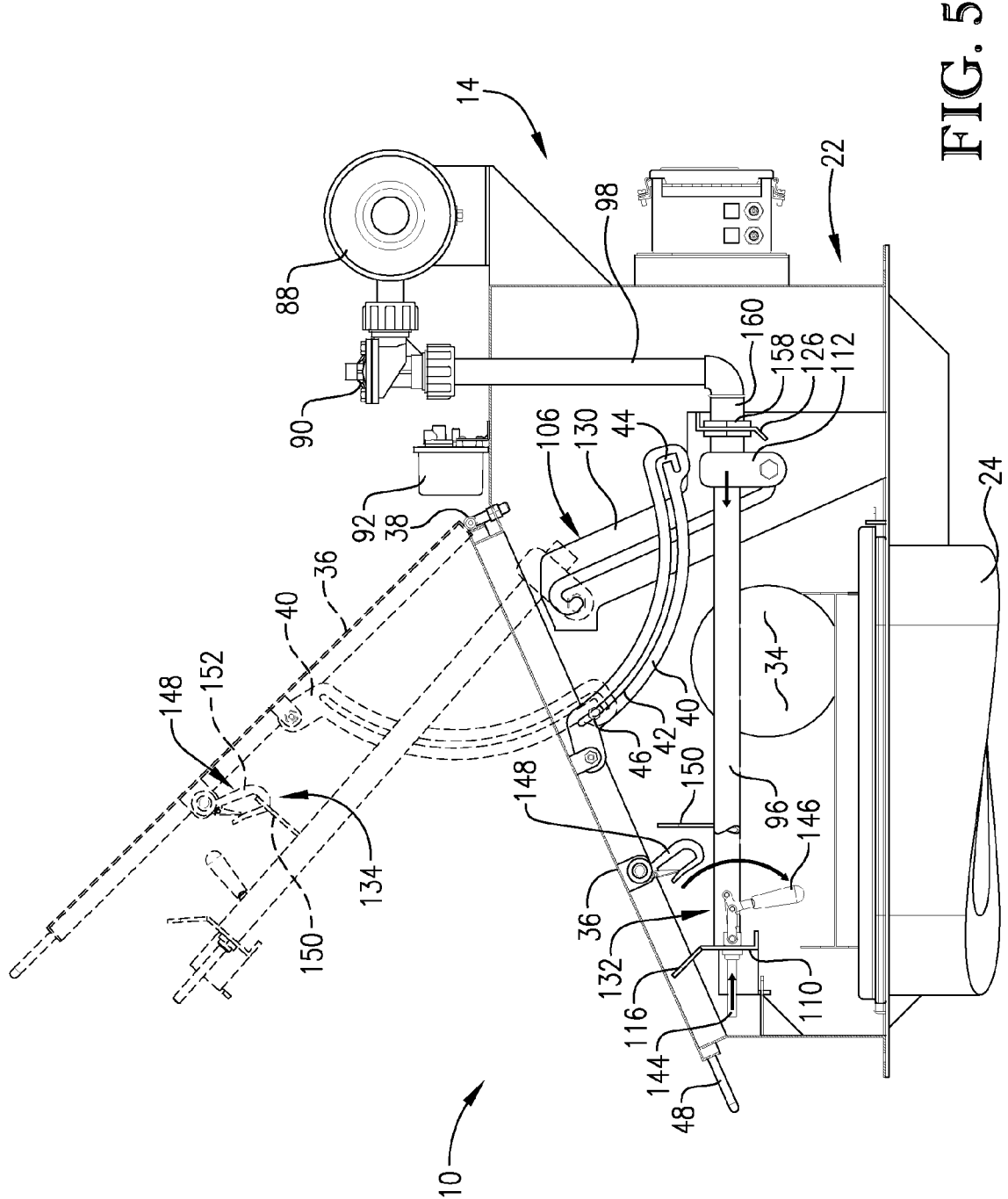
FIG. 5 is a partial side elevation view of the dust collector system and illustrating the cover and the air distribution assembly in a lowered, operational position in solid line and a raised, service position in phantom.
Figure 8:
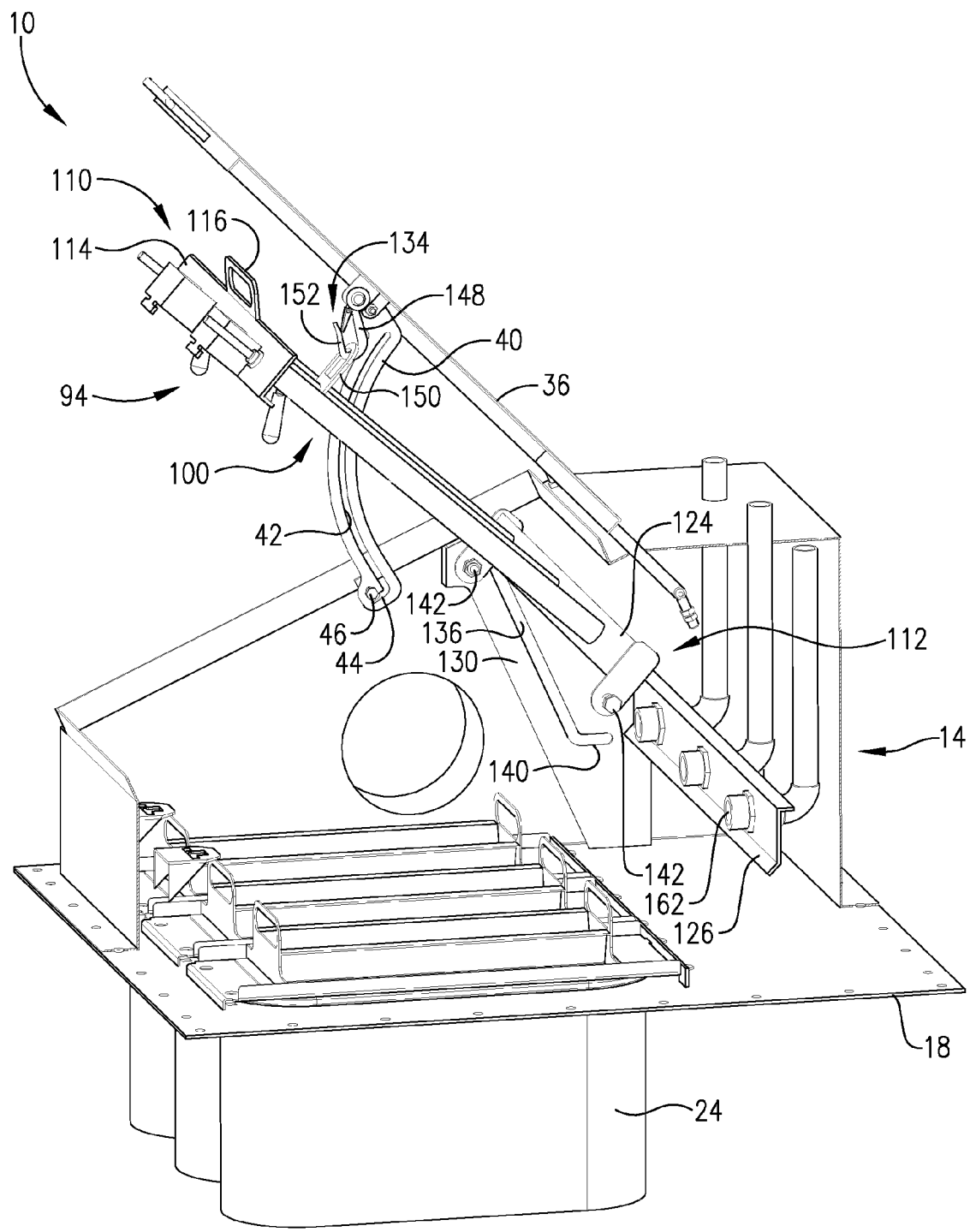
FIG. 8 is a partially fragmented isometric view of the dust collector system and illustrating the cover and the air distribution assembly in the raised, service position.

As illustrated in FIG. 5, the upper chamber 22 of the housing 14 includes a cover 36 configured to seal the upper chamber 22 and substantially prevent air from escaping the upper chamber 22 during operation of the dust collector system 10. The cover 36 is pivotable about an elongated hinge 38 and with respect to the upper chamber 22 for ease of access to the air filter cartridges 24 housed within the upper chamber 22. As illustrated in FIGS. 4, 5, and 8, the cover 36 includes at least one arcuate drop 40, and preferably left and right arcuate drops 40. Each drop 40 includes a track 42 having a J-loop 44 (only the left side of the cover 36 is shown in FIGS. 4, 5, and 8). Each track 42 is movably engaged with a bearing 46 secured to the housing 14. During pivoting of the cover 36 about the elongated hinge 38, the bearing 46 slides along the arcuate track 42, as illustrated in FIG. 5. In the cover's raised position illustrated in FIG. 8, the bearing 46 slides along and terminates within the J-loop 44. An operator of the system 10 can grasp a handle 48 on the cover 36 to assist in raising and lowering the cover 36.

Referring to FIG. 1, the hopper 16 extends from a bottom of the lower chamber 20 of the housing 14 and through the base 12. The hopper 16 is configured to receive dust filtered from the air inputted into the housing 14. The hopper 16 can be any shape operable to collect the dust, and in embodiments of the present invention, the hopper 16 is generally pyramidal in shape.

The dust collector system 10 may be positioned at a height several feet above a floor, such that the base 12 is mounted on a scaffold (not shown). In certain dust collection arrangements, a duct (not shown) may extend from the base 12, and in particular, from the hopper 16, to act as a conduit for collected dust from the system 10. The collected dust is then transported via the duct to a location where it can be collected and disposed.

Figure 11:
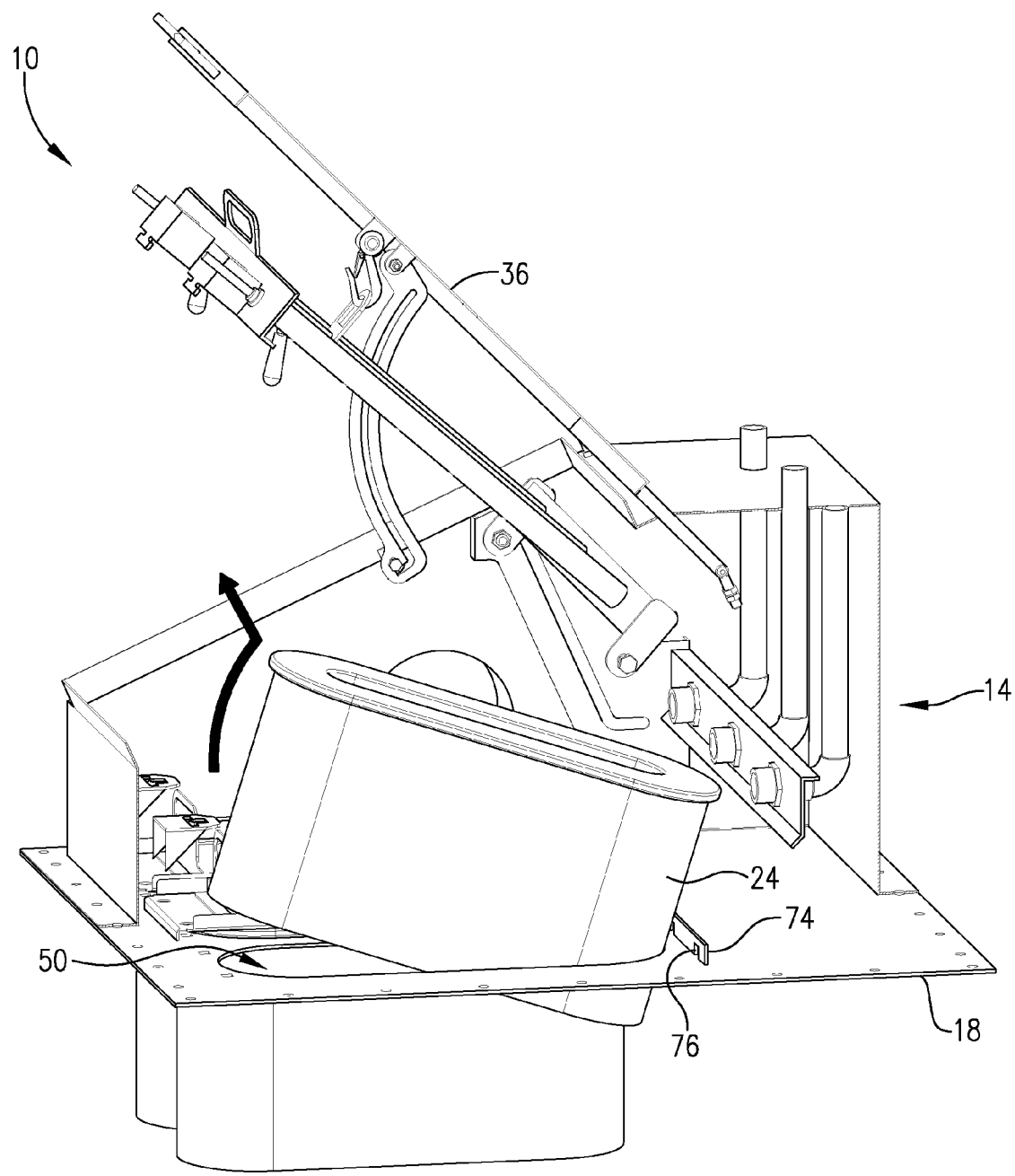
FIG. 11 is a partially fragmented isometric view of the dust collector system and illustrating removal of the air filter cartridge from the dust collector.

As noted above and referring to FIGS. 3 and 6, the tube sheet 18 is mounted within the housing 14 and generally separates the housing 14 into the lower and upper chambers 20,22. The tube sheet 18, also known in the art as cell plate, is formed of steel, aluminum, or other suitably rigid material. The tube sheet 18 includes at least one receptacle 50, and preferably a plurality of receptacles 50, comprising an opening through the tube sheet 18 for receipt of the air filter cartridge 24, as illustrated in FIGS. 11 and 12.

It is to be appreciated that dust collector systems 10 of embodiments of the present invention could exclude the base 12 and could also employ a housing that did not include a dirty air chamber 20 secured or integral with the housing. In such case, the tube sheet 18 of embodiments of the present invention could be mounted directly over a hopper, a silo, a bin, or a machinery enclosure. In such case, the hopper, the silo, the bin, or the respective machinery enclosure would essentially serve as the dirty air chamber. The dust collector system 10 mounted on the base 12 and including the integral dirty air chamber 20 described herein is intended to be exemplary only and is not intended to limit use of the pulsed air system 26 of embodiments of the present invention.

It is also to be appreciated that the pulsed air system 26 of embodiments of the present invention could be used with a variety of filters having filter media. For example, air filter cartridges 24 of a particular known type and shape or described herein. However, other air filters, such as bag filters, could be employed. The description of the invention in reference to air filter cartridges 24 is only intended for ease of understanding in describing the pulsed air system 26 of embodiments of the present invention and is in no way limiting to a particular type of filter or filter media.

Figure 12:
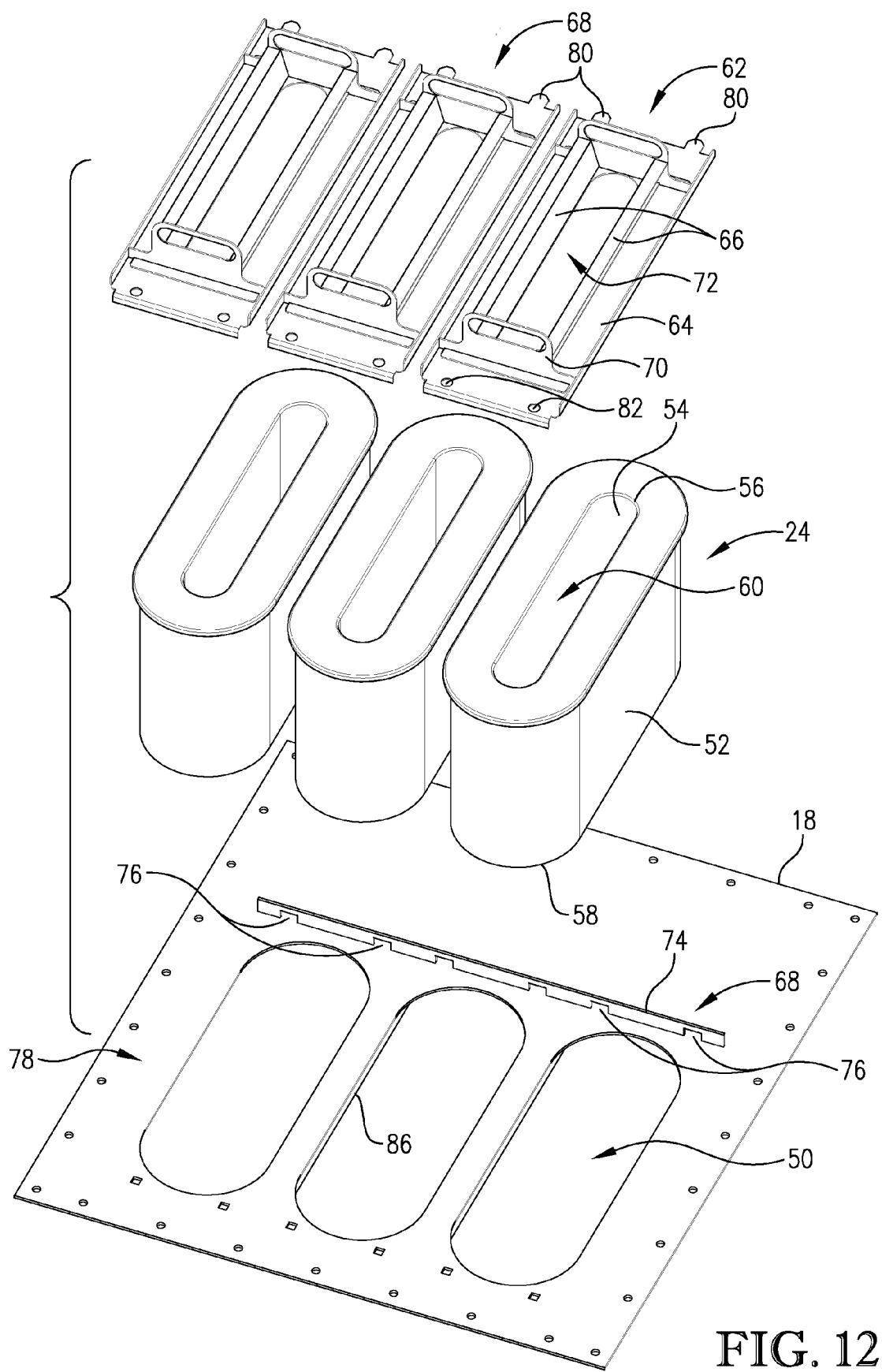
FIG. 12 is an exploded top view of the tube sheet, the air filter cartridge, and the cartridge retainer for the cartridge.
Figure 13:
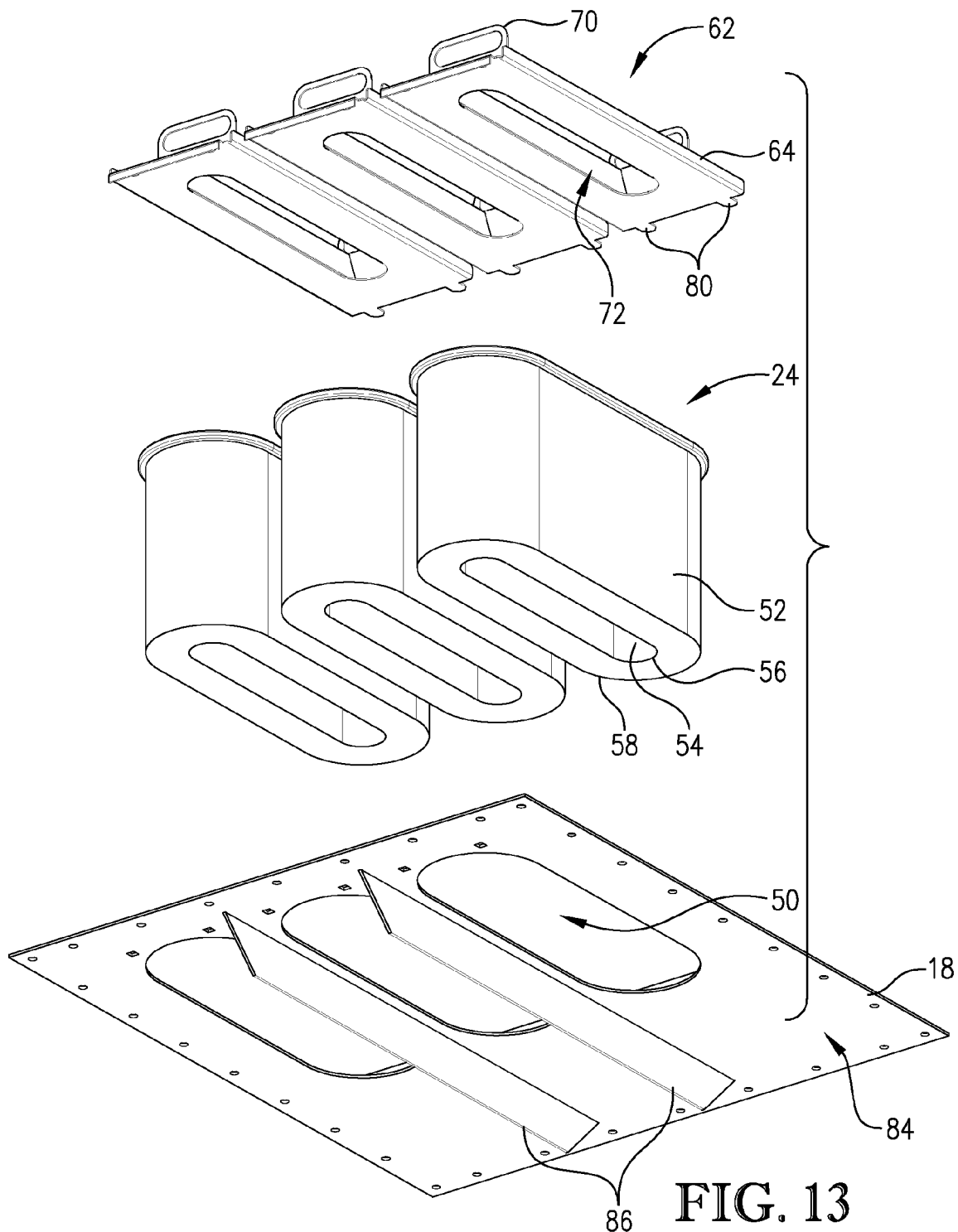
FIG. 13 is an exploded bottom view of the tube sheet, the air filter cartridge, and the cartridge retainer for the cartridge.

In embodiments of the present invention, the air filter cartridge 24 is of a generally oblong or obround shape, as best illustrated in FIGS. 12 and 13, although other shapes of air filter cartridges 24 could be employed. Preferably, the general shape of the air filter cartridge 24 is substantially the same as the receptacle 50 formed in the tube sheet 18 so that the cartridge 24 slides therethrough in a relatively close fit. As is known in the art, the cartridges 24 include filter media 52 that catch and collect the dust from the particulate-laden air passing through the cartridge 24. The filter media 52 surround a filter cage 54, such that the filter cage 54 presents an inner perimeter 56 of the filter cartridge 24, and the filter media 52 present an outer perimeter 58 of the filter cartridge 24. Referring to FIG. 12, the inner perimeter 56 thus presents a hollowed opening 60. The filter media 54 are periodically cleaned of collected dust by pulsing pressurized air through the hollowed opening 60 and the filter media 54 via the pulsed air system 26, as described in more detail below.

Figure 10:
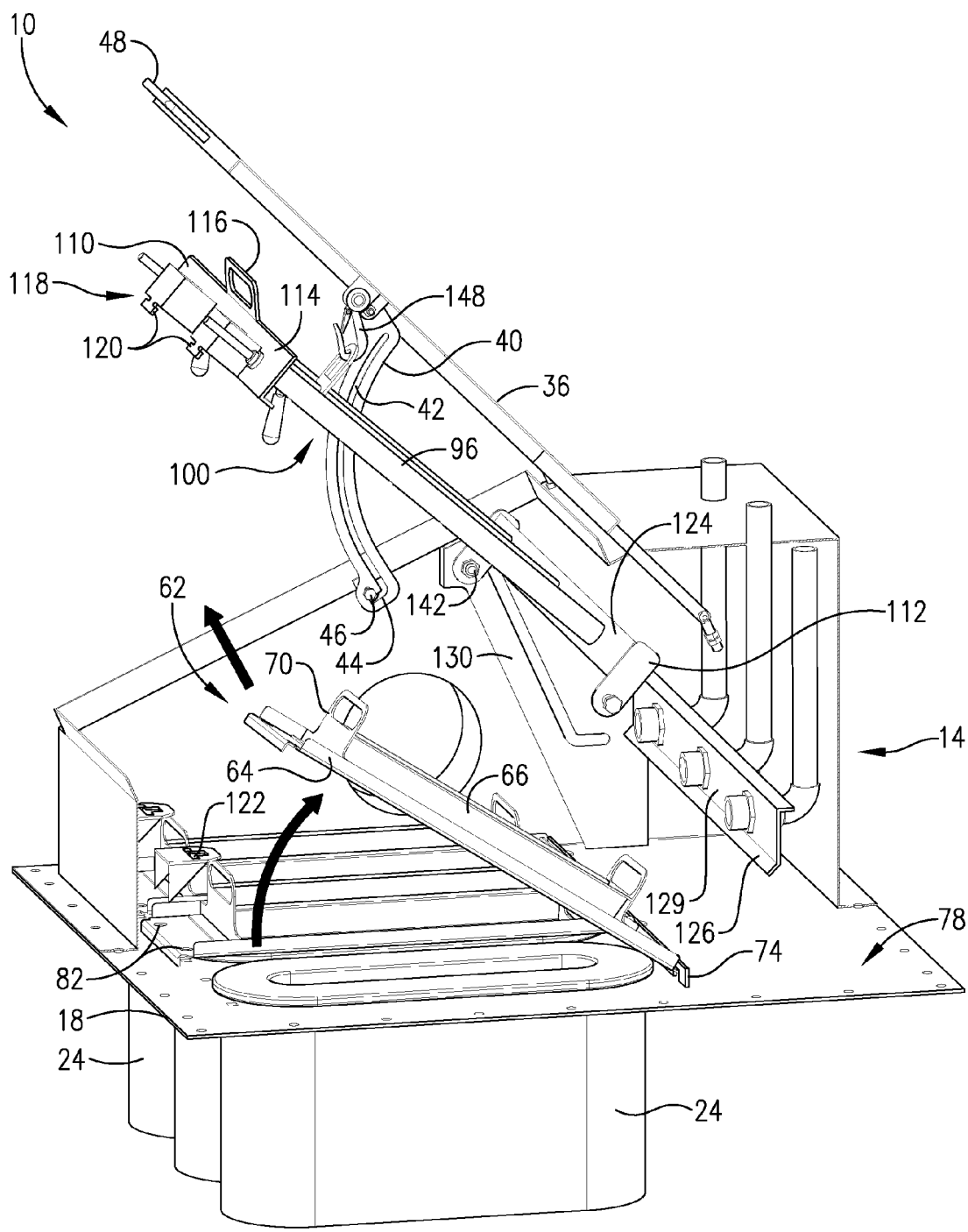
FIG. 10 is a partially fragmented isometric view of the dust collector system and illustrating a cartridge retainer for an air filter cartridge and removal of the cartridge retainer from the dust collector.

As illustrated in FIG. 12, each filter cartridge 24 is secured within the tube sheet 18 via a cartridge retainer 62. Each cartridge retainer 62 is configured to be easily removed for replacement of the cartridge 24. The cartridge retainer 62 broadly comprises a generally planar body 64, a plurality of tapered walls 66 extending upwardly from the body 64, a securement mechanism 68 for removably securing the cartridge retainer 62 to the tube sheet 18, and a handle 70. The planar body 64 is sized to substantially surround the outer perimeter 58 of the filter cartridge 24, as illustrated in FIG. 10. The upwardly extending tapered walls 66 present an opening 72 in the cartridge retainer 62 that is approximately the same size as the inner perimeter 56 of the filter cartridge 24, as illustrated in FIG. 12. Thus, when in a closed position, the cartridge retainer 62 is positioned over the cartridge 24, such that the opening 72 in the cartridge retainer 62 is substantially aligned with the hollowed opening 60 through the filter cartridge 24.

The upwardly extending tapered walls 66 of the cartridge retainer 62 assist in guiding the pulsed air to and through the filter cartridge 24. The walls 66 are tapered approximately 5°-25°, more preferably approximately 10°-20°, and most preferably approximately 15° relative to vertical. The walls 66 serve to create a Venturi effect of the pulsed air through the opening 72 and the filter cartridge 24. Due to the tapered walls 66, air pulsed through the opening 72 encounters a narrowed passageway (i.e., from the widest to the narrowest width of the opening 72) so as to create a slight Venturi effect. The Venturi effect creates a slightly negative pressure at the opening 72 that assists in dislodging accumulated dust on the filter media 52.

Referring to FIG. 12, an elongated rail 74 having a plurality of openings 76 therethrough is secured to an upper face 78 of the tube sheet 18. The cartridge retainer 62 of the cartridge 24 is removably secured to the tube sheet 18 by mating each tab 80 on the cartridge retainer 62 with the respective opening 76 in the elongated rail 75, as illustrated in FIG. 10. Each tab 80 fits within the opening 76 to form a loose hinge. The cartridge retainer 62 then rests against the tube sheet 18. In embodiments of the present invention, wing nuts (not shown) can be inserted through openings 82 in the cartridge retainer 62 to further secure the cartridge retainer 62 to the tube sheet 18. To remove the cartridge retainer from the tube sheet 18, an operator lifts the cartridge retainer 62 upwards via the handle 70 and then partially towards the operator (to the left as illustrated in FIG. 10), such that the tabs 80 slide out of the openings 76 in the elongated rail 74.

Referring to FIG. 13, a lower face 84 of the tube sheet 18 is illustrated presenting a plurality of angled ribs 86 spaced between the filter cartridge receptacles 50 in the tube sheet 18. The ribs 86 extend approximately a length of the tube sheet 18 and are angled at approximately 45° from vertical (i.e., from a plane extending perpendicularly through the lower face 84 of the tube sheet 18). Although only two ribs 86 are illustrated in FIG. 13, more or less ribs 86 could be used depending on the placement of the receptacles 50, and therefore, the filter cartridges 24, in the tube sheet 18. Moreover, the ribs 86 could be angled more or less than 45° depending on the type of filter cartridge 24 used, including filter media 52, the pressure of the pressurized air through the filter cartridge 24, the type of dust being filtered, and other operational parameters.

Referring to FIGS. 4-9, the pulsed air system 26 of embodiments of the present invention broadly comprises a pressurized (i.e., compressed) air source 88; at least one pulsed air valve 90; a controller 92 for controlling the pulsed air valve 90 and pulsed distribution of the pressurized air; an air distribution assembly 94 including a plurality of purge pipes 96; and tubing 98 for delivering the pressurized air from the pressurized air source 88 and to the air distribution assembly 94.

In embodiments of the present invention, the pressurized air source 88 is a tank of compressed air positioned on the upper chamber 22 of the housing 14. However, it is to be appreciated that the air source 88 can be any suitable source for supplying pressurized air to the air distribution assembly 94. For example, the source could be remote from the dust collector system 10.

Figure 2:
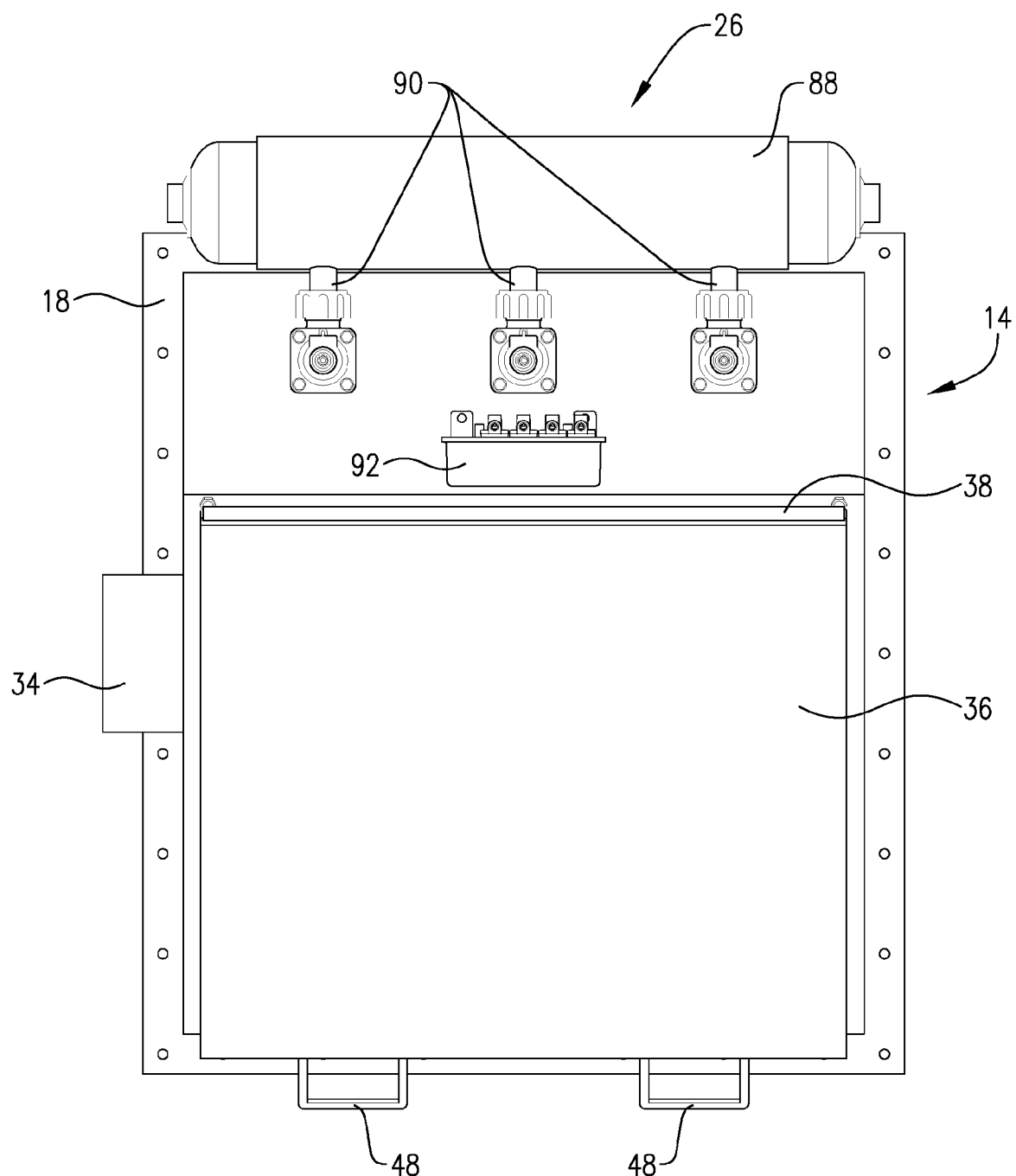
FIG. 2 is a plan view of the dust collector system.

The pulsed air valve 90 is preferably controlled by the controller 92 and is operable to selectively deliver pressurized air to the air distribution assembly 94 in short pulses or bursts. As illustrated in FIGS. 1-2, more than one valve 90 may be employed depending on the size of the air distribution assembly 94 and the number of purge pipes 96. For example, three valves 90 are illustrated in the drawing figures. A suitable valve is manufactured by Goyen Valve under product number RCAC25DD3000.

The controller 92 is preferably programmable, either directly or remotely via a communications network, to instruct a duration of each pulse of pressurized air and a time between pulses. A suitable controller is manufactured by National Controls Corporation under product number DNC-T2010-A10.

Tubing 98 connects the air source 88 to the valve 90, and the valve 90 to the air distribution assembly 94, as illustrated in FIG. 4. Therefore, each purge pipe 96 of the air distribution assembly 94 is fluidly connected to a respective tube 98 for receipt of pressurized air through the purge pipe 96, as described in more detail below.

Figure 6:
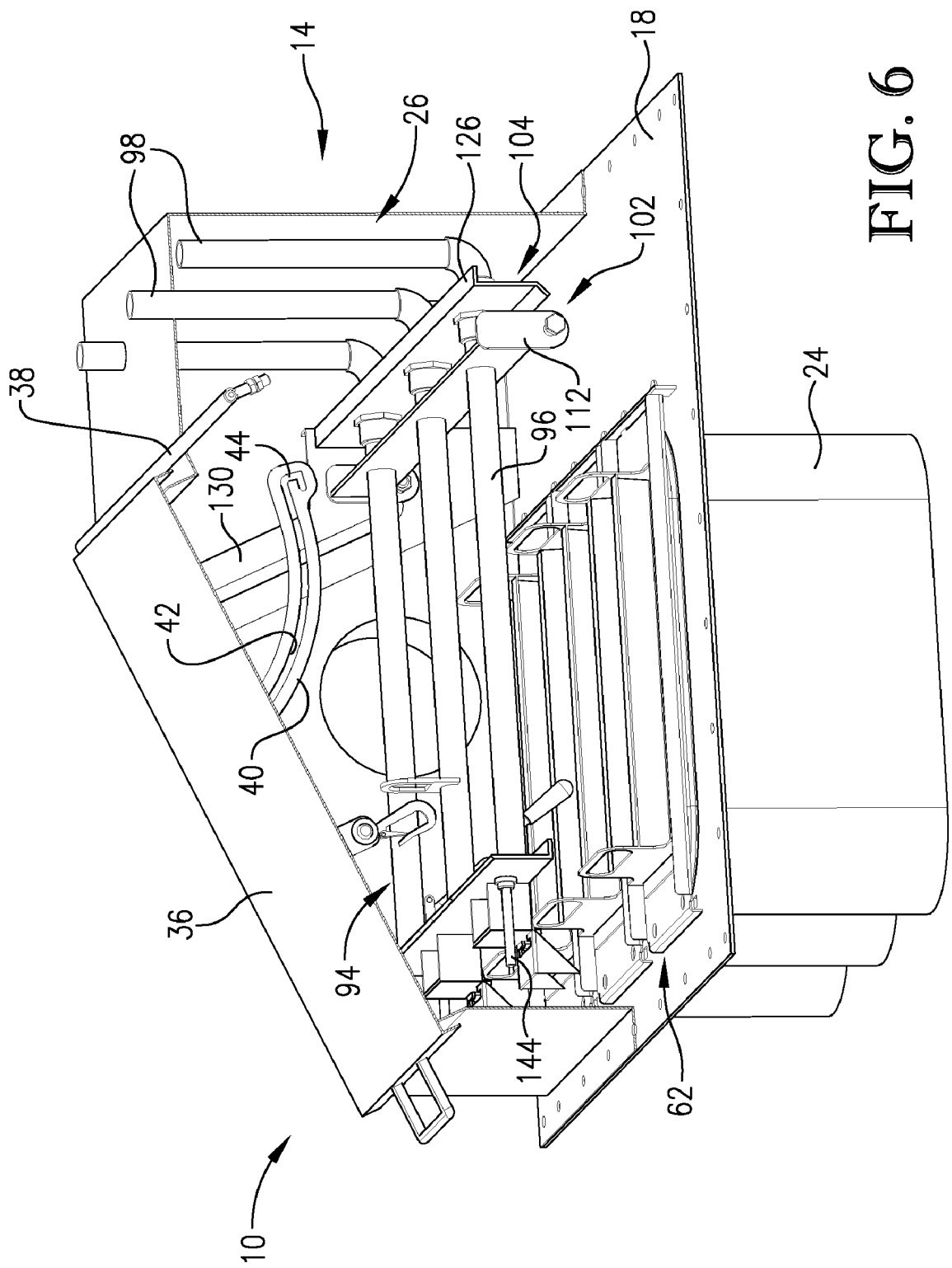
FIG. 6 is a partially fragmented isometric view of the dust collector system and particularly illustrating a tube sheet, a fragment of the cover in the operational position, and a fragment of the air distribution assembly.

Referring to FIG. 6, the air distribution assembly 94 broadly comprises an air distribution manifold 100 including the plurality of purge pipes 96 and a frame 102 for supporting at least some of the purge pipes 96, wherein at least two or more of the purge pipes 96 are coupled together in a generally unitary assembly; a coupling assembly 104 for fluidly connecting the purge pipes 96 with the tubing 98; and a positioning assembly 106 for selectively positioning and removably locking the air distribution manifold 100 in either of a service position or an operational position.

Figure 9:
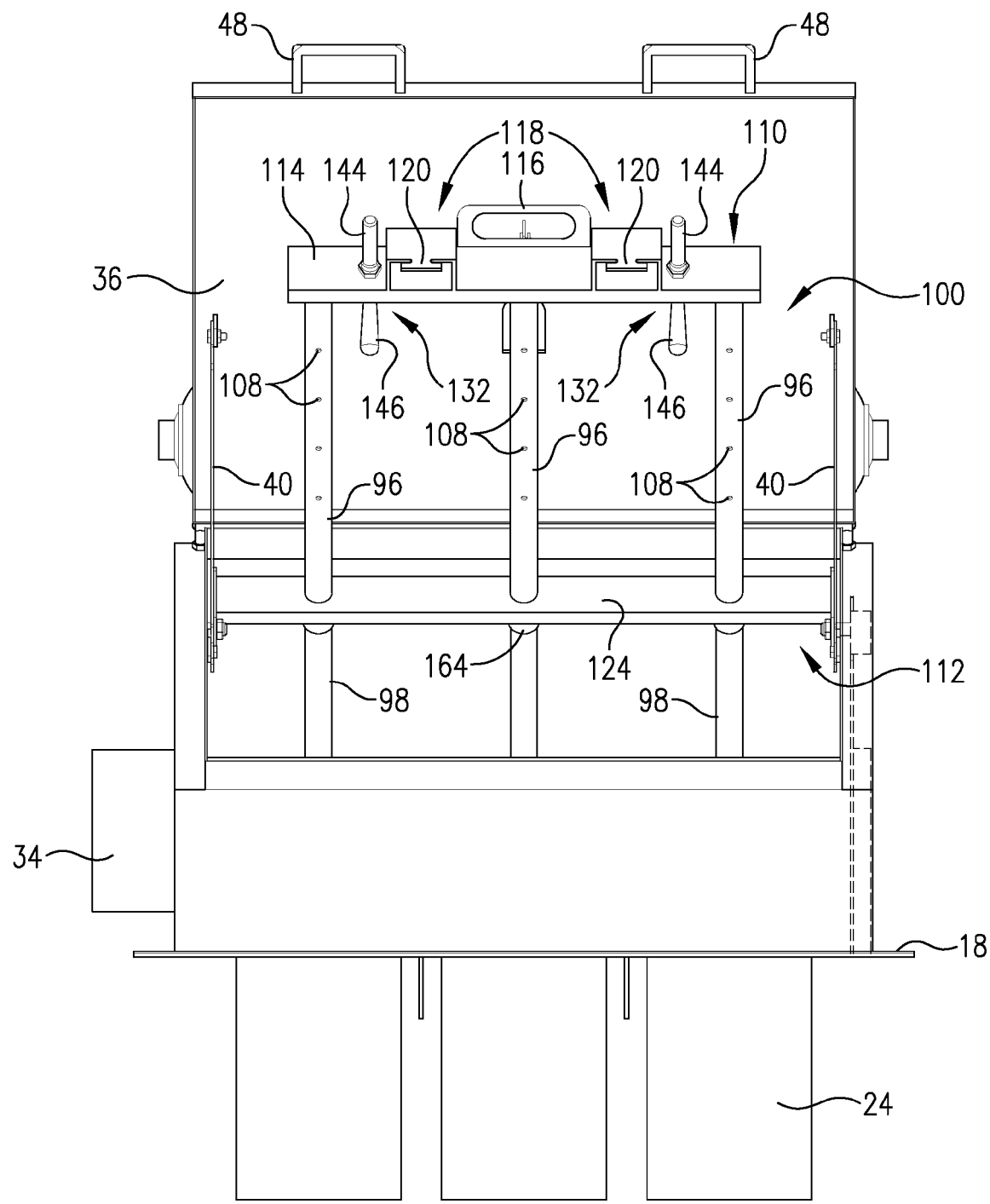
FIG. 9 is a front elevation view of the dust collector system and illustrating the cover and the air distribution assembly in the raised, service position.

Referring to FIG. 9, the purge pipes 96 are generally elongated and are positioned above the air filter cartridge 24 for directing pressurized air against and through the filter cartridges 24. In embodiments of the present invention, the pipes 96 are positioned preferably approximately 2-10 inches above the air filter cartridges 24 and more preferably approximately 4-8 inches above the cartridges 24.

Each pipe 96 includes small openings 108, preferably approximately less than 1/3 inch diameter, through a bottom of the pipe 96 facing the air filter cartridge 24 (See FIG. 9). The pipe 96 is fluidly connected to the respective pulsed air valve 90 for the pipe, such that pressurized air passes through the pipe 96, the openings 108 in the pipe 96, and the air filter cartridge 24. As described above, the pressurized air assists in dislodging collected dust from the filter media 52.

Figure 7:
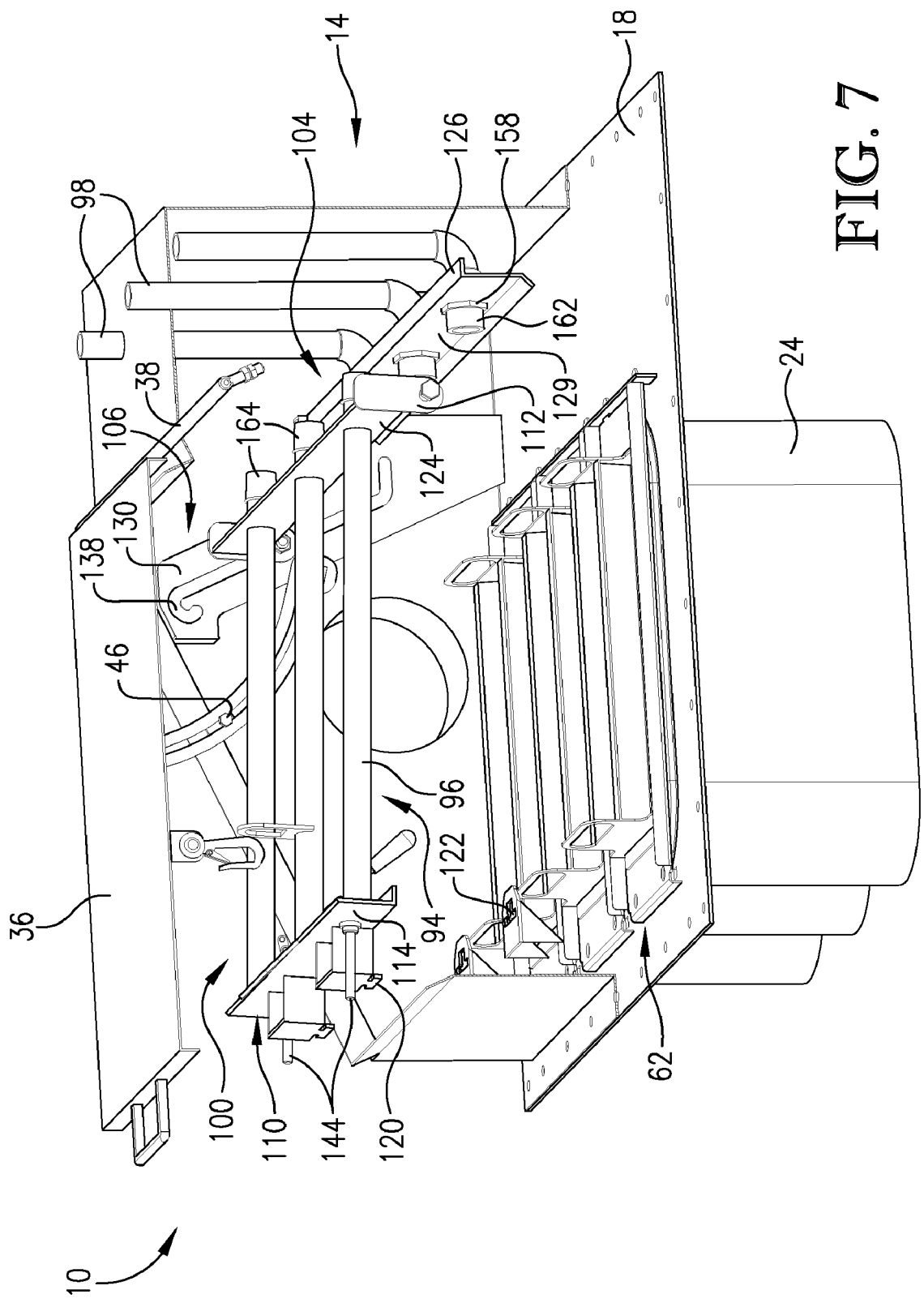
FIG. 7 is a partially fragmented isometric view of the dust collector system and illustrating the cover and the air distribution assembly in a partially raised position.

Referring to FIGS. 7 and 9, the air distribution manifold 100 generally includes the frame 102, which supports the plurality of purge pipes 96. The frame 102 broadly comprises a header 110 and a footer 112 between which the plurality of purge pipes 96 are coupled and secured so as to form a generally unitary assembly. However, it is to be appreciated that the frame 102 could employ any support structure for the plurality of purge pipes 96 that couples at least two or more of the purge pipes 96 together into the generally unitary assembly. For reference herein, a "generally unitary assembly" is to be defined as any assembly that couples together, either directly or indirectly and either removably or permanently, two or more purge pipes 96, such that positioning or movement of one of the two or more purge pipes 96 necessarily results in the other of the purge pipes 96 also being positioned or moved.

In alternative embodiments of the present invention, the frame 102 could employ the header 110, the footer 112, and left and right supporting members (not shown), and the purge pipes 96 could be coupled to a combination of the header 110, the footer 112, and the supporting members so as to provide the generally unitary assembly. Alternatively, the frame 102 could employ members (not shown) intermittently spaced between the plurality of purge pipes 96 for coupling the purge pipes 96 into the generally unitary assembly. For example, instead of or in addition to the header 110 and the footer 112, two or more purge pipes 96 could be coupled together via cross-wise, generally perpendicular members intersecting the two or more pipes 96.

In preferred embodiments of the present invention, the plurality of purge pipes 96 are permanently coupled to the frame 102, such that the purge pipes 96 cannot be removed from the frame 102 without damage to either or both of the frame 102 and the pipes 96. Therefore, in embodiments of the present invention, the purge pipes 96 are not removably coupled with the frame 102. In the embodiment illustrated in FIG. 6, the purge pipes 96 are welded to or otherwise integral with the header 110 and footer 112 of the frame 102. Although the purge pipes 96 are illustrated as being positioned generally vertical (i.e., along a front to a rear of the dust collector system 10), the purge pipes 96 could be positioned generally horizontal (i.e., along a left to a right side of the system 10). Moreover, although the pipes 96 are illustrated as being parallel to each other, the purge pipes 96 could intersect. In sum, placement of the purge pipes 96 will be dependent on a location of the air filter cartridges 24 within the tube sheet 18, a location of the openings 108 in the pipes 96 through which pressurized air impacts the filter media 52, and a location that results in optimal cleaning of the filter media 52.

As best illustrated in FIGS. 8 and 9, the header 110 comprises a first plate 114 to which a proximal end of each purge pipe 96 is secured. The header 110 includes one or more handles 116 for grasping during positioning of the air distribution manifold 100. The header 110 further includes a mating portion of a forward locking mechanism 118 for locking the header 110 in the operational position and supporting the air distribution manifold 100 in the operational position. In embodiments of the present invention, the locking mechanism 118 is a pair of keys each having male and female components. The male component presents a T-shaped tab 120 carried on the header 110. As illustrated in FIG. 4, the female component is mounted to the housing 14 and presents an opening 122 positioned to receive the T-shaped tab 120 when the manifold 100 is in the lowered, operational position.

Referring to FIG. 8, the footer 112 of the air distribution manifold 100 comprises a second plate 124 to which a distal end of each purge pipe 96 is secured. The footer 112 includes a plurality of openings (not shown) of approximately the same diameter as each purge pipe 96 for fluidly connecting the purge pipes 96 to the tubing 98.

In an embodiment of the present invention, the coupling assembly 104 generally comprises an elongated rear manifold 126 disposed between the footer 112 of the air distribution manifold 100 and the tubing 98; and at least one quick-couple fitting 126 for coupling the plurality of purge pipes 96 with the respective tubing 98 and providing an air tight connection between the pipes 96 and tubing 98 during operation.

Referring to FIG. 7, the rear manifold 126 comprises a third plate 129 of approximately the same size as the second plate 124 of the footer 112. Similar to the footer 112, the rear manifold 126 includes openings therethrough of approximately the same size as the diameter of the purge pipes 96 for fluidly communicating pressurized air through the rear manifold 126.

Each purge pipe 96 is in fluid communication with a quick-couple fitting 156. The fitting 156 broadly comprises a hollowed body 158 having an open tube section 160 and an open purge pipe section 162. The body 158 is disposed on either planar side of the rear manifold 126. The tube section 160 is positioned on a rear face of the rear manifold 126 and proximal the tubing 98, and the purge pipe section 162 is position on a front face of the rear manifold 126 and proximal the purge pipes 96. The body 158 is hollowed so that pressurized air can pass from the tubing 98, through the body 158, and to the purge pipes 96. A suitable quick-couple fitting 156 is manufactured by Goyen Valve under product number BH25SS.

As best illustrated in FIG. 7, an elongated, cylindrical rubber gasket 164 is positioned over the tubing 98, and similarly, an elongated, cylindrical rubber gasket 164 is positioned over each purge pipe 96. Each cylindrical gasket is made of rubber or other flexible, compressible material that will form a tight connection with its mating element. The cylindrical gaskets 164 are snug fit over each of the tubing 98 and purge pipes 96. A diameter of the combined tubing 98 and the cylindrical gasket 164 is slightly less than a diameter of the tube section 160 of the fitting 156, such that the combined tubing 98 and gasket 164 form a snug, tight fit in the tube section 160 of the fitting 156. Similarly, a diameter of the combined purge pipe 96 and the cylindrical gasket 174 is slightly less than a diameter of the purge pipe section 162 of the fitting 156, such that the combined purge pipe 96 and gasket 164 form a snug, tight fit in the tube section 160 of the fitting 156. As can be appreciated, the tubing 98 and gasket 164 combination will not be repeatedly removed and reinserted into the tube section 160 of the fitting 156 like the purge pipe 96 and gasket 164 combination will when the air distribution manifold 100 is selectively positioned from the service to the operational position.

The quick-couple fitting 156 therefore assists in providing the air tight sealing connection between the purge pipes 96 of the air distribution assembly 94 and the tubing 98. This is desirable so as to prevent leaking of pressurized air into the upper chamber 22.

To assist in removing the purge pipe 96 and gasket 164 combination from the purge pipe section 162 of the fitting 156, a release mechanism (not shown) could be employed. In embodiments of the present invention, the release mechanism comprises a lever pivotably connected to a rod. Pivoting of the lever in a first direction serves to apply pressure against the rear manifold 126 while in the service position. Position of the lever in a second direction servers to apply reverse pressure to the rear manifold 126 so as to disengage the air distribution manifold 100 from the operational position, and consequently the purge pipes 96 from the fitting 156. Use of the release mechanism may be needed if the tight fluid communication between the purge pipes 96 and the fitting 156 cannot be disengaged by the operator pulling the manifold 100 outwards.

In alternative embodiments of the present invention, the coupling assembly 104 may include a gasket 128 instead of the fitting 156 to obtain the air tight sealing between the purge pipes 96 and the rear manifold 126. The coupling assembly 104 would therefore generally comprise the elongated rear manifold 126 and the gasket 128 disposed between the footer 112 and the elongated rear manifold 126 to assist in creating the air tight connection between the plurality of purge pipes 96 and respective tubing 98 during operation.

Figure 14:
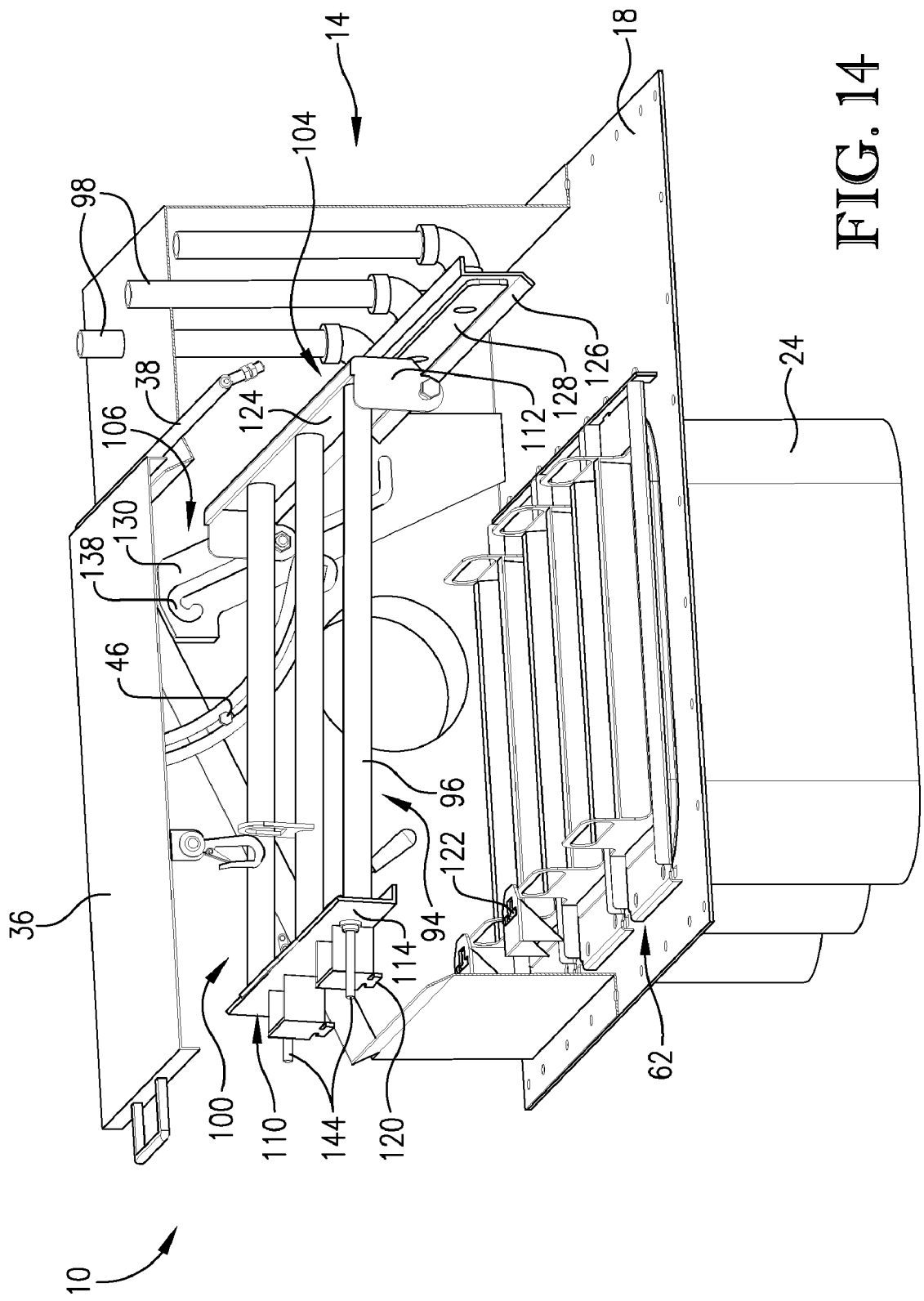
FIG. 14 is a partially fragmented isometric view of a dust collector system of alternative embodiments of the present invention and illustrating an alternative coupling assembly.

Referring to FIG. 14, the gasket 128 is associated with, and preferably secured to and along, the rear manifold 126 so that each purge pipe 96 is sealingly engaged with the gasket 128 and the rear manifold 126. Although an elongated gasket 128 is illustrated in the drawing figures, individual gaskets 128 for each purge pipe 96 could be employed.

Although various types of coupling assemblies 104 or other mechanisms for providing the sealing engagement have been described, other coupling assemblies can be employed to sealingly connect the purge pipes 96 with the respective tubing 98 quickly, easily, and without tools.

The positioning assembly 106 comprises at least one bracket 130, and in preferred embodiments of the present invention, a pair of brackets 130, associated with the housing 14 of the dust collector system 10 and on which the frame 102 travels during lowering and raising of the frame 102 for service; at least one clamp 132 for securing the air distribution manifold 100 in the operational position; and a latch 134 for securing the air distribution manifold 100 in the service position.

As illustrated in FIGS. 5, 7, and 8, positioning of the air distribution manifold 100 is guided by the bracket 130, and in preferred embodiments of the present invention, opposing left and right brackets 130 (only the left-hand side bracket is illustrated in FIG. 5). The bracket 130 extends from the tube sheet 18 and is otherwise coupled with the housing 14 of the system 10. Each bracket 130 presents a track 136 that is generally elongated. At its upper end, the track terminates with a J-loop 138, and at its lower end, the track terminates with a generally horizontal line 140. As illustrated in FIG. 7, a bearing 142 is located on each end of the footer 112 of the frame 102. The bearing 142 is operable to slide within and along the track 136. When positioning the air distribution manifold 100 against the rear manifold 126, the air distribution manifold 100 slides along the terminal horizontal line 140 of the track 136 and against the rear manifold 126. When the air distribution manifold 100 is held in the raised, service position, the bearing 142 slides along the J-loop 138.

In embodiments of the present invention, the at least one clamp 132, and preferably two clamps 132, are provided for assisting in sealingly engaging the purge pipes 96 against the rear manifold 126 in the operational position. Referring to FIGS. 4-6, the clamp 132 assists in providing the air tight communication of the purge pipes 96 with the tubing 98. In particular, the clamp 132 serves to compress fit each purge pipe 96 against the gasket 128 and rear manifold 126. Moreover, the clamp 132 retains correct positioning of the purge pipes 96 during pulsing of the pressurized air through the pipes 96. As can be appreciated, the pressurized air through the pipes 96 results in a certain amount of thrust that must be contained in order to properly position the pipes 96 over the cartridges 24. The clamp provides the tight and secure position of the pipes 96 relative to the cartridges 24, even given the thrust resulting from the pressurized pulses of air.

In more detail and as known in the art, each clamp 132 is a straight-line clamp that includes a retractable tension rod 144 (see FIG. 6) extending from the header 110 of the air distribution manifold 100, and a handle 146 for selectively positioning the rod 144. When the handle 146 is in the thrown or operational position, such that the handle 146 is pointing generally upwards as illustrated in FIG. 4, the tension rod 144 is in an extended position. In the extended position, the tension rod 144 is forced against an opposing body, such as the front of the housing 14. The force of the tension rod 144 against the front of the housing 14 reactively pushes the air distribution manifold 100 towards a rear of the housing 14, which results in compression fitting the footer 112 of the air distribution manifold 100 against the rear manifold 126.

When the handle 146 is in a release or service position, such that it is pointed generally downward as illustrated in FIG. 5, the tension rod 144 is in a retracted position. When in the retracted position, the tension rod 144 is not forced against the opposing body (i.e., the front of the housing 14). There is then room for movement of the air distribution manifold 100 along a portion of the length of the housing 14, such that the operator can slide the air distribution manifold 100 towards the operator and along the horizontal line 140 of the bracket 130, as discussed in more detail below. An exemplary straight-line clamp 132 is sold by De-Sta-Co of Auburn Hills, Mich. under Model No. 604.

The latch 134 for securing the air distribution manifold 100 in the service position comprises a quick-release carabiner 148 secured to a lower face of the housing cover 36 and a tab 150 extending upwardly from the air distribution manifold 100. As best illustrated in FIG. 5, the carabiner 148 is operable to removably couple the air distribution manifold 100 with the cover 36, so that the cover 36 and the manifold 100 can be latched together in the raised position. As illustrated in FIG. 6, the carabiner 148 includes a spring-loaded hook 152 operable to latch with an opening in the tab 150.

In operation, the operator commonly stands in front of the housing 14 of the dust collector system 10 to install and/or replace air filter cartridges 24. The operator first lifts the housing cover 36, which results in the cover 36 pivoting about the elongated hinge 38 and concurrently sliding along the track 42 of the arcuate drop 40. The operator then releases the handle 146 of the clamp 132 by rotating it downwards, as illustrated in FIG. 5. The tension rod 144 of the clamp 132 then retracts, which allows the operator to move the air distribution manifold 100. The operator slides the air distribution manifold 100 towards the operator a few inches and along the horizontal line 140 in the bracket 130. The operator then raises the air distribution manifold 100 upwards to slide the bearing 142 located on the manifold 100 along the track 136 of the bracket 130. Once in the raised position, the operator couples the housing cover 36 with the air distribution manifold 100 via the carabiner 148.

Once the air distribution manifold 100 is in the raised, service position, the operator can access the air filter cartridges 24. Referring to FIG. 10, the operator raises the cartridge retainer 62 over the air filter cartridge 24 to be installed and/or replaced. The cartridge retainer 62 can either be pivoted about the tab 80 and elongated rail 74 so as to access the cartridge 24, or the cartridge retainer 62 can be removed completely by sliding, and thus separating, the tab 80 from the rail 74. If the cartridge retainer 62 is removed completely, it can be laid aside over another filter cartridge and cartridge retainer. The operator then removes and installs and/or replaces the cartridge 24.

To reposition the system 10 in the operational position, the operator installs the cartridges 24, replaces the cartridge retainers 62 for the cartridges 24 by sliding the tabs 80 in the elongated rail 74, unlatches the air distribution manifold 100 from the housing cover 36, and lowers the manifold 100 to its lowered position by sliding it along the tracks 136 of bracket 130. Once in the lowered position, the operator slides the air distribution manifold 100 away from the operator along the horizontal line 140 of the bracket 130 and towards the rear manifold 126. When the air distribution manifold 100 is generally positioned against the rear manifold 126, the operator throws the handle 146 of the clamp 132 so as to extend the tension rod 144. Extension of the rod 144 results in the air distribution manifold 100 being compressed fit against the rear manifold 126 so as to obtain an air tight communication between the tubing 98 providing the pressurized air and the purge pipes 96. The housing cover 36 is then lowered into the service position.

Advantageously, the above servicing method is performed by an operator without tools and without removal of purge pipes 96 from the housing 14 of the dust collector system 10. The operator does not need to place various components of the system 10 in a location where they could fall onto the ground below, could fall into the hopper 16 of the dust collector system 10, or otherwise be misplaced. Additionally, the air distribution manifold 100 is self-aligning so that the operator can quickly and easily position the manifold 100 in the service position while still obtaining the needed air tight communication.

Although the invention has been described with reference to the preferred embodiment(s) illustrated in the attached drawing figures, it is noted that equivalents may be employed and substitutions made herein without departing from the scope of the invention as recited in the claims. For example, other positioning assemblies for selectively positioning the air distribution manifold 100 could also be employed in alternative embodiments of the present invention. Instead of the air distribution manifold 100 being raised and lowered as shown in the drawing figures, the air distribution manifold 100 could rotate about a pivot (not shown) at either a left or a right hand side of the housing 14 of the dust collector system 10. The operator could then rotate the manifold 100 upwards to the service position and then lower the manifold 100 downwards to the operational position.

In even further alternative embodiments of the present invention, the air distribution manifold 100 could comprise two or more sets of coupled frames 102 and purge pipes 96. For example, the air distribution manifold 100 could comprise a left-hand manifold and a right-hand manifold (not shown), such that the left-hand manifold comprises at least two purge pipes 96 coupled together, and the right-hand manifold comprises at least two purge pipes 96 coupled together. Each of the left and right-hand manifolds could be raised and lowered to the service and operational positions as described above, either via use of a bracket or via pivoting about a hinge. In one alternative embodiment of the present invention, the left and right-hand manifolds pivot about their left and right-hand sides, respectively, similar to double-doors swinging open. As can be appreciated, a variety of positioning assemblies could be employed for selectively positioning one or more air distribution manifolds in the service and operational positions.

In even further alternative embodiments of the present invention, the purge pipes 96 could travel with or otherwise be coupled with the cover 36 of the housing 14. Alternatively, the air distribution manifold 100 comprising the frame 102 and plurality of purge pipes 96 could travel with or otherwise be coupled with the cover 36 of the housing 14. In this alternative embodiment, two or more purge pipes 96 are coupled together in a generally unitary assembly, as positioning or movement of one of the two or more purge pipes 96 results in the other of the purge pipes 96 also being positioned or moved.

It is to be understood that the pulsed air system, and specifically the air distribution manifold, described herein could be used over any pressurized pulsed air system. Use of the pulsed air system for cleaning of filter media is an exemplary embodiment only.

Having thus described embodiments of the present invention, what is claimed as new and desired to be protected by Letters Patent includes the following:

1. A dust collector system comprising:
a pulsed air system for use in at least partially cleaning air filters, the pulsed air system including—
a pressurized air source;
an air distribution assembly including a plurality of purge pipes for use in at least partially cleaning air filters;
tubing for delivering the pressurized air to the air distribution assembly;
at least one pulsed air valve for delivering pressurized air from the pressurized air source to the tubing;
an air distribution manifold including the plurality of purge pipes and a frame for supporting at least some of the purge pipes,
wherein at least two or more of the purge pipes are coupled together;
a coupling assembly for fluidly connecting the purge pipes with the tubing; and
a positioning assembly for selectively positioning and removably locking the air distribution manifold in either of a service position or an operational position.

2. The dust collector system of claim 1, further comprising a housing
a tube sheet mounted within the housing and including a plurality of receptacles for respective receipt of an air filter; and
a cover for covering the housing.

3. The dust collector system of claim 2, the positioning assembly including—
at least one bracket associated with the housing of the dust collector system and on which the frame travels,
at least one clamp for securing the air distribution manifold in the operational position, and
a latch for securing the air distribution manifold in the service position.

4. The dust collector system of claim 3,
wherein the bracket presents an elongated track terminating at an upper end with a J-loop and at a lower end with a generally horizontal line,
wherein the frame includes a bearing operable to slide within and along the track so as to selectively raise and lower the air distribution manifold to either of the service or operational positions.

5. The dust collector system of claim 3, wherein the clamp is a straight-line clamp having a retractable tension rod and a handle for selectively positioning the rod.

6. The dust collector system of claim 3, wherein the latch is a quick-release carabiner secured to a lower face of the cover of the housing.

7. The dust collector system of claim 1, wherein the air distribution manifold is configured to be selectively positioned to either of the service position or the operational position without removal or disconnection of the plurality of purge pipes from the housing.

8. The dust collector system of claim 1, wherein the coupling assembly includes—
an elongated rear manifold disposed between the frame of the air distribution manifold and the tubing, and
a coupler to assist in creating an air tight connection between the plurality of purge pipes and respective tubing during operation.

9. A dust collector system comprising:
a housing including a cover for covering the housing;
a tube sheet mounted within the housing and including at least one receptacle for receipt of an air filter;
and a pulsed air system for at least partially cleaning the air filter, the pulsed air system including an air distribution assembly having—
a plurality of purge pipes,
an air distribution manifold including a frame for supporting at least some of the plurality of purge pipes,
wherein at least two or more of the purge pipes are coupled together in a generally unitary assembly,
tubing for transfer of pressurized air from a pressurized air source and to the plurality of purge pipes, and
a coupling assembly for fluidly connecting the purge pipes with the tubing; and
a positioning assembly for selectively positioning and removably locking the air distribution manifold in either of a service position or an operational position, the positioning assembly including—
at least one bracket associated with the housing and on which the frame travels,
at least one clamp for securing the air distribution manifold in the operational position, and
a latch for securing the air distribution manifold in the service position.

10. The dust collector system of claim 9, the frame including a footer and a header, wherein the plurality of purge pipes are permanently coupled with the footer and the header.

11. The dust collector system of claim 10, the coupling assembly including—
a rear manifold disposed between the footer of the air distribution manifold and the tubing, and
at least one quick-couple fitting configured to assist in creating an air tight connection between the plurality of purge pipes and respective tubing during operation.

12. The dust collector system of claim 9,
wherein the bracket presents an elongated track terminating at an upper end with a J-loop and at a lower end with a generally horizontal line,
wherein the frame includes a bearing operable to slide within and along the track so as to selectively raise and lower the air distribution manifold to either of the service or operational positions.

13. The dust collector system of claim 9, wherein the clamp is a straight-line clamp having a retractable tension rod and a handle for selectively positioning the rod.

14. The dust collector system of claim 9, wherein the air distribution manifold is configured to be selectively positioned to either of the service position or the operational position without removal or disconnection of the plurality of purge pipes from the housing.

15. A pulsed air system comprising:
a pressurized air source;
at least one pulsed air valve;
a controller for controlling the pulsed air valve and pulsed distribution of the pressurized air;
an air distribution manifold including—
a plurality of pipes, and
a frame having header and a footer for supporting the plurality of pipes,
wherein the pipes are coupled together in a generally unitary assembly;

tubing for delivering the pressurized air from the pressurized air source and to the air distribution manifold;
a coupling assembly for fluidly connecting the purge pipes with the tubing, the coupling assembly including—
   an elongated rear manifold disposed between the footer of the frame and the tubing, and
   at least one quick couple fitting configured to assist in creating an air tight connection between the plurality of pipes and respective tubing during operation; and
a positioning assembly for selectively positioning and removably locking the air distribution manifold in either of a service position or an operational position.

16. The pulsed air system of claim 15, the positioning assembly including—
at least one bracket on which the frame travels,
at least one clamp for securing the air distribution manifold in the operational position, and
a latch for securing the air distribution manifold in the service position.

17. The pulsed air system of claim 16,
wherein the bracket presents an elongated track terminating at an upper end with a J-loop and at a lower end with a generally horizontal line,
wherein the frame includes a bearing operable to slide within and along the track so as to selectively raise and lower the air distribution manifold to either of the service or operational positions.

* * * * *

UNITED STATES PATENT AND TRADEMARK OFFICE
CERTIFICATE OF CORRECTION

| | | |
|---|---|---|
| PATENT NO. | : 8,157,878 B2 | |
| APPLICATION NO. | : 12/576048 | |
| DATED | : April 17, 2012 | |
| INVENTOR(S) | : Jason Weber et al. | |

It is certified that error appears in the above-identified patent and that said Letters Patent is hereby corrected as shown below:

On the cover page, the city of the first-listed inventor, Jason Weber, should read --Seneca, KS (US)--.

Signed and Sealed this
Fifth Day of June, 2012

David J. Kappos
*Director of the United States Patent and Trademark Office*